| DECIMAL | CORE #5 | CORE #4 | CORE #3 | CORE #2 | CORE #1 | AND BUSS | OR BUSS | C INHIBITOR OUT |
|---|---|---|---|---|---|---|---|---|
| 0 | 0 | 0 | 0 | 0 | 0 | 0 | 0 | 0 |
| 1 | 0 | 0 | 0 | 0 | 1 | 0 | 0 | 0 |
| 2 | 0 | 0 | 0 | 1 | 0 | 0 | 0 | 0 |
| 3 | 0 | 0 | 0 | 1 | 1 | 0 | 0 | 0 |
| 4 | 0 | 0 | 1 | 0 | 0 | 0 | 1 | 0 |
| 5 | 0 | 0 | 1 | 0 | 1 | 0 | 1 | 0 |
| 6 | 0 | 0 | 1 | 1 | 0 | 0 | 1 | 0 |
| 7 | 0 | 0 | 1 | 1 | 1 | 0 | 1 | 0 |
| 8 | 0 | 1 | 0 | 0 | 0 | 0 | 1 | 0 |
| 9 | 0 | 1 | 0 | 0 | 1 | 0 | 1 | 0 |
| 10 | 0 | 1 | 0 | 1 | 0 | 0 | 1 | 0 |
| 11 | 0 | 1 | 0 | 1 | 1 | 0 | 1 | 0 |
| 12 | 0 | 1 | 1 | 0 | 0 | 0 | 1 | 0 |
| 13 | 0 | 1 | 1 | 0 | 1 | 0 | 1 | 0 |
| 14 | 0 | 1 | 1 | 1 | 0 | 0 | 1 | 0 |
| 15 | 0 | 1 | 1 | 1 | 1 | 0 | 1 | 0 |
| 16 | 1 | 0 | 0 | 0 | 0 | 0 | 0 | 0 |
| 17 | 1 | 0 | 0 | 0 | 1 | 0 | 0 | 0 |
| 18 | 1 | 0 | 0 | 1 | 0 | 0 | 0 | 0 |
| 19 | 1 | 0 | 0 | 1 | 1 | 1 | 0 | 1 |
| 20 | 1 | 0 | 1 | 0 | 0 | 0 | 1 | 0 |
| 21 | 1 | 0 | 1 | 0 | 1 | 0 | 1 | 0 |
| 22 | 1 | 0 | 1 | 1 | 0 | 0 | 1 | 0 |
| 23 | 1 | 0 | 1 | 1 | 1 | 1 | 1 | 0 |
| 24 | 1 | 1 | 0 | 0 | 0 | 0 | 1 | 0 |
| 25 | 1 | 1 | 0 | 0 | 1 | 0 | 1 | 0 |
| 26 | 1 | 1 | 0 | 1 | 0 | 0 | 1 | 0 |
| 27 | 1 | 1 | 0 | 1 | 1 | 1 | 1 | 0 |
| 28 | 1 | 1 | 1 | 0 | 0 | 0 | 1 | 0 |
| 29 | 1 | 1 | 1 | 0 | 1 | 0 | 1 | 0 |
| 30 | 1 | 1 | 1 | 1 | 0 | 0 | 1 | 0 |
| 31 | 1 | 1 | 1 | 1 | 1 | 1 | 1 | 0 |
| 32 | 0 | 0 | 0 | 0 | 0 | 0 | 0 | 0 |

INVENTOR.
FRANCIS A. WISSEL
BY Alden D. Redfield
Irwin P. Garfinkle
ATTORNEYS.

Jan. 21, 1969 F. A. WISSEL 3,423,728

DECODING ARRANGEMENT WITH MAGNETIC INHIBITOR MEANS FOR PROVIDING A FAIL-SAFE COMMAND SIGNAL

Filed Nov. 29, 1963 Sheet 2 of 2

INVENTOR.
FRANCIS A. WISSEL
BY Alden D. Redfield
Irwin P. Garfinkle
ATTORNEYS.

United States Patent Office 3,423,728

Patented Jan. 21, 1969

3,423,728

DECODING ARRANGEMENT WITH MAGNETIC INHIBITOR MEANS FOR PROVIDING A FAIL-SAFE COMMAND SIGNAL

Francis A. Wissel, Cincinnati, Ohio, assignor to Avco Corporation, Cincinnati, Ohio, a corporation of Delaware Filed Nov. 29, 1963, Ser. No. 326,659

U.S. Cl. 340—146.1 13 Claims

Int. Cl. G08b 29/00; G08c 19/16

ABSTRACT OF THE DISCLOSURE

A fail-safe command signal generated by the voltage developed in the last stage of a binary shift register (the least significant bit of a binary number) is connected through an AND gate and a back-biased diode to the primary winding of a transformer. Those stages properly filled wtih binary "1's" are also connected to the AND gate which comprises a diode for each stage. Each diode serves to short-circuit the command signal when a particular stage is not properly filled. The stages representing binary "0's" are connected to the primary winding through an OR gate comprising a diode for each stage. Each diode permits the passage of current representing improper information. This serves to neutralize current through the primary winding and inhibit the command signal at the transformer.

This invention relates to inhibiting circuitry for providing fail-safe operation of a command system, and more particularly to a simple magnetic inhibitor utilizing a transformer in combination with an AND gate and an OR gate for rendering the generation of a commad signal impossible under virtually all possible failure conditions.

This invention discloses a novel gate circuit which performs the functions common to the inhibitor of the prior art but providing essential features for the fail-safe performance required by certain command receivers. For example, a command receiver used for arming an atomic warhead must operate only upon receipt of a proper command, and in the event of failure in any of the circuit components or in the event of an incorrect code, must fail safe, i.e., unarmed.

Generally, the invention comprises a novel magnetic inhibitor in combination with a novel system of gates. The inhibitor is provided with a phased transformer having limited primary and secondary circuitry driving a temperature-compensated transistor-amplifier in a controlled manner. The inhibitor is used in conjunction with a digital decoder including an AND gate, an OR gate, and a shift register, the AND gate being connected to those cores in the shift register having outputs representing "1's" and the OR gate being connected to those cores in the shift register having outputs representing "0's." The output of the AND gate is connected to one side of the primary winding of the inhibitor-transformer while the output of OR gate is connected to the other side. The AND gate, when properly filled with coded information, serves to energize the transformer, but when not properly filled, serves to short-circuit the command signal. The OR gate when provided with proper coded information is ineffective in the system, but when supplied with improper coded information, serves to inhibit current flow in the primary winding of the inhibitor-transformer.

It is the primary object of this invention to provide a magnetic inhibitor comprising a transformer, the primary winding of which is positively energized only under proper relationship of voltages applied to the terminals of the primary winding.

Another object of this invention is to provide a magnetic inhibitor comprising a transformer havng a primary winding, one side of which is connected to an AND gate and the other side of which is connected to an OR gate, an improper command signal through the OR gate serving to short-circuit the primary winding and the absence of a proper command signal at the AND gate serving to inhibit the command signal.

Still another object of this invention is to provide a fail-safe inhibitor for digital decoding which can detect erroneous codes, which does not rely on an active device for the inhibitor elements and which will fail safe under almost all conceivable operating malfunctions.

Another object of the invention is to provide a simple, reliable fail-safe inhibitor to recognize either the excess or deficit of "1's" and to inhibit action when such a condition exists at the sampling time.

For further objects and advantages of this invention, reference should now be made to the following detailed specification and drawings in which.

Figures 1, 3:
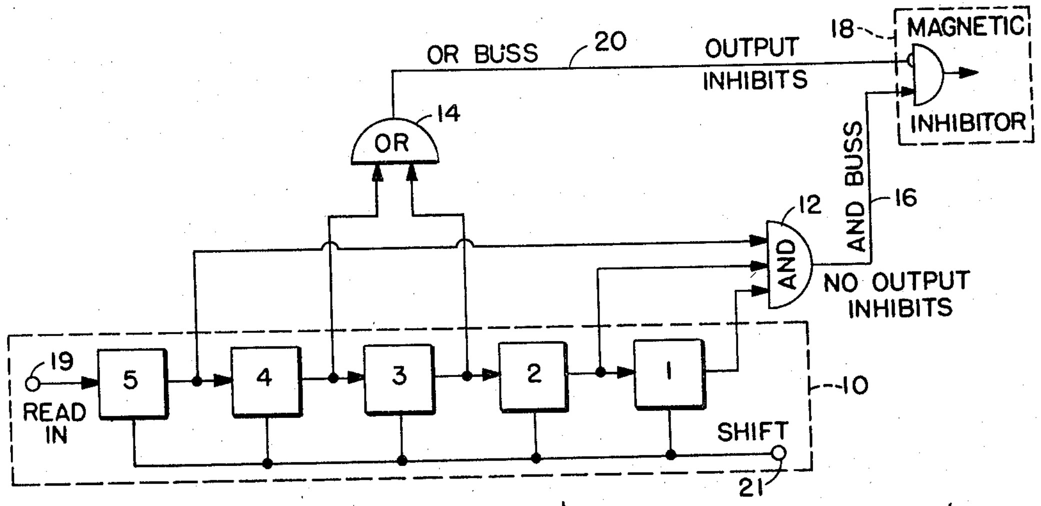
FIGURE 1 is a block diagram showing the operation of the invention.
FIGURE 3 is a table showing the possible binary codes that can be stored in a five-bit shift register.

To illustrate the principles of this invention, a block diagram form is shown in FIGURE 1 incorporating a conventional magnetic-core shift register 10 having five magnetic-core stages 1–5. The system is set up for operation only when a particular code word is read into the shift register; in this case the code word is "binary 19," i.e., 10011. Normally, all the stages in the shift register are in the "0" state before a code sequence is read into the register. During the read-in process the least significant bit is read into stage 5 and is shifted to the right until it is shifted out of the stage 1 by the fifth shift pulse. The stored code is sampled coincidentally with this last shift pulse by the logic circuitry. The shift register 10 is immediately cleared after the sampling operation to accept the reception of another coded message. If a given core or stage has a "1" stored, the "sampling period" shift produces an output pulse. If a "0" is stored, the pulse is absent.

As indicated by reference to FIGURE 3, when a proper code word has been read in, the stages 1, 2, and 5 should produce pulses (representing proper "1's") while the stages 3 and 4 should produce no pulses (representing proper "0's"). The system is arranged so that the "1" output from stage 1 provides the command signal. The outputs of each of stages 1, 2, and 5, are connected to AND gate 12, while the proper outputs from stages 3 and 4 are connected to the OR gate 14. The command output (i.e., the "1" output of stage 1) from the AND gate 12 is connected through an AND buss 16 to one side of a magnetic inhibitor 18, while the output from the OR gate 14, if any, is connected through an OR buss 20 to the other side of the magnetic inhibitor 18. Unless a "1" pulse is applied to the AND gate 12 from each of the stages 2 and 5, as well as from the stage 1, the "1" output is short-circuited in the AND gate and no output is developed in the buss 16. Therefore, no output is developed from the inhibitor 18. If a "1" pulse is applied to the OR gate from either or both of the stages 3 or 4, an output is developed from the OR gate 14, neutralizing the input to the magnetic inhibitor 18, thus avoiding an output command signal. If properly addressed, "1" pulses in each of stages 2 and 5 and no pulses in stages 3 and 4 will permit the "1" pulse output of stage 1 to develop a command output from the inhibitor 18.

Figure 2:
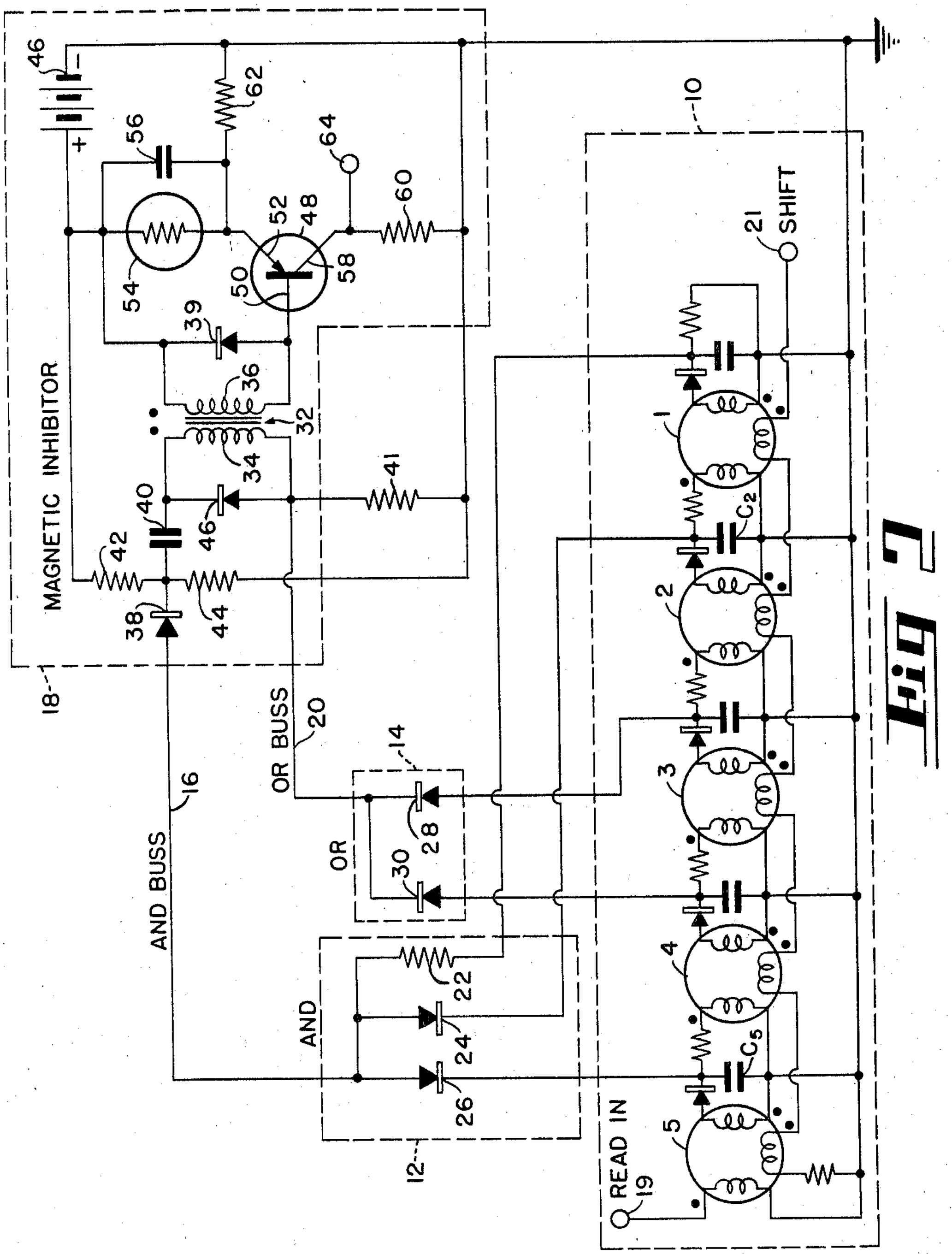
FIGURE 2 is a schematic illustrating a typical embodiment of the invention.

Referring now to the details of the system shown in FIGURE 2, the magnetic shift register 10 is conventional and a complete description may be found in "Pulse and Digital Circuits" by Millman & Taube, pp. 425–427, published by McGraw-Hill Book Company, Inc., 1956. Suffice it to say that digital information is read into stage 5 from the terminal 19 and is then shifted down the line by the simultaneous application of a shift pulse at terminal 21 to all of the shift register stages 1–5. At each application of a shift pulse the stored data is advanced one stage until the register is filled. A "1" pulse in stage 1 provides the command signal for the system.

The AND gate 12 comprises a resistor 22 connected to the output of stage 1 and two diodes 24 and 26 connected to the outputs of the stages 2 and 5, respectively. When the register is filled and shift-sampled, whatever output is developed at the stage 1 is applied to the AND buss through the resistor 22. However, the diodes 24 and 26 are poled to oppose conduction of the currents developed at stages 2 and 5. Therefore, only the output from the stage 1 is supplied to the magnetic inhibitor 18. Similarly, the OR gate 14 comprises two diodes 28 and 30 connecting the outputs developed at the stages 3 and 4 to the OR buss 20. The diodes 28 and 30 are oppositely poled with respect to the diodes 24 and 26 so that if a voltage pulse is developed in the stages 3 or 4, these diodes will conduct. When a proper code is read into the shift register, no voltage pulses are developed in the stages 3 and 4.

As already noted, one feature of this invention resides in the use of addresses or code words involving only odd numbers. As may be observed from FIGURE 3, all even decimal numbers, when converted to binaries, end with "0's." On the other hand, all odd decimal numbers, when converted to binaries, end with "1's." By using odd decimal numbers, no current can be supplied to the AND buss 16 until such time as the stage 1 is filled, and this occurs only after the complete address has been read in. Therefore, the system is not accidentally operable but can only operate upon the receipt of a complete five-bit command.

The voltages appearing on the AND buss 16 and the OR buss 20 are applied to the magnetic inhibitor 18. The magnetic inhibitor 18 comprises a transformer 32 having a primary winding 34 and a secondary winding 36, the dots indicating the direction of the windings, current flow due to current in the AND buss 16 resulting in a direction from the dot. The AND buss 16 is connected to one side of the primary winding 34 through a diode 38 and a capacitor 40. The OR buss 20 is connected directly to the other side of the primary winding 34, which is connected to ground through a resistor 41. For the purpose of clipping any voltages appearing on the AND buss 16, the diode 38 is back biased by means of voltage-dividing resistors 42 and 44 connected across a battery 46, the negative side of which is grounded. A diode 46 oppositely poled from diode 38 is connected across the primary winding 34. A similarly poled diode 39 is connected across the secondary winding 36 to short-circuit any currents flowing in the reverse direction (toward the dot).

The voltage, if any, developed across the secondary winding 36 serves to drive a PNP-type transistor 48 having a base 50 connected to one side of the winding 36 and an emitter 52 connected to the other side of the winding 36 through a sensitor 54 and a capacitor 56. The collector 58 of transistor 48 is reverse biased by a connection to the grounded side of battery 46 through a load-resistor 60, forward bias for the emitter 52 being provided by a connection to the junction of a temperature-variable sensitor 54 and resistor 62 connected in series across the battery 46. This biasing arrangement serves to maintain the emitter 52 about ½ volt less than the battery voltage (18 volts) to keep the transistor 48 cut off over the entire operating range. The output, if any, from the magnetic inhibitor is derived from across the load-resistor 60 at the terminal 64.

Assume that a proper code, in this case 10011, the binary of decimal 19, has been read into the system. Positive voltage pulses then appear in the outputs of stages 1, 2, and 5 and no voltage pulses appear in the outputs of stages 3 and 4. Thus, positive voltage pulses are applied to the anodes of the diodes 24 and 26 in the AND gate 12 and also to the resistor 22. Since there is no voltage at the output of stages 3 and 4, no voltages are applied to the diodes 28 and 30. The voltages applied to the diodes 24 and 26 back bias those diodes beyond cut-off and the output from stages 2 and 5 is not applied to the AND buss 16 and does not affect inhibitor operation. However, the voltage output at stage 1 develops a current flow in the AND buss 16 through the resistor 22. This developed current is then applied through the clipping diode 38 and capacitor 40 across the primary winding 34 and resistor 41. The resulting current flow through the winding 34 develops a current in the secondary winding 36 which serves to drive the transistor 48 into conduction and thereby generate a voltage output at the terminal 64. The voltage developed at the terminal 64 provides the ultimate command signal to be generated.

Thus, it is apparent that a properly addressed code will serve to generate a command signal. The problem, however, is to provide a system which will generate a command only upon the reading in of a proper address and which will not generate a command in the event of failure in any portion of the system. That is to say, the problem is to provide a fail-safe system. The following discussion will indicate how this invention, by simple means, accomplishes this result.

As was previously noted, a voltage cannot be developed on the AND buss 16 until the shift register has been filled, and then only with an odd number. Thus, a command cannot be generated at output terminal 64 when only a partial address has been written into the register.

In the event that an incorrect address has been read into the register, the system will also fail. Obviously if an even number is read in, no output is developed on the AND buss 16, and hence a command signal is not generated.

The system will also fail safe if an address containing a "1" to "0" translation, i.e., if an address differing from the proper address by having one or more "1's" translated to "0's is read in. For example, referring to FIGURE 3, if the decimal number 17 is read in, a positive voltage pulse will be developed at the outputs of stages 1 and 5 and zero outputs will be developed at the outputs of stages 2, 3 and 4. Thus, incorrect information is in the stage 2 since a "1' pulse is absent. Under this circumstance the voltage developed across the resistor 22 will serve to forward bias the anode of the diode 24, and since there is no back bias on diode 24, the current flow from the output of the stage 1 will be shunted to ground through the low impedance path of the diode 24 and the capacitor C2 in the output of the stage 2. Thus, currents developed at the output of the stage 1 cannot serve to trigger a command. Similarly, if a "1" pulse were absent at the output of the stage 5, for example, if the number "3" were read into the register 10, the voltage developed across the resistor 22 would serve to forward bias the diode 26, short-circuiting any current flow from the output of the stage 1 through the capacitor C5.

Another possible error condition is where the addressed code contains one or more "0" to "1" translations. Such a condition would exist in the particular example if the binary 23, i.e., 11101, were read in. Under these circumstances the stages 1, 2, 3, and 5 would have "1" pulses and stage 4 would be at "0." Since the diodes 24 and 26 in the AND gate 12 would be properly back biased, the currents developed at the output of stage 1 would be supplied through the resistor 22 to the AND buss 16 and through the diode 38 and capacitor 40. However, the positive "1" pulse appearing at the output of stage 3 serves to forward bias the diode 28, and current flow results from the output of the stage 3 through the diode 28, the diode 46, capacitor 40, and the resistor 44 to ground. The magnitude of the pulse voltage across resistor 44 plus the back-bias voltage on diode 38 (to provide clipping of the voltages appearing on the AND buss 16) is greater than the voltage on buss 16. Therefore, the net current flow through the primary winding is opposite to normal output (or "negative") and relatively small due to the shunt path of diode 46, and no voltage is induced into the secondary winding 36 and transistor 48 remains nonconductive. Furthermore, since all of the outputs from the stages 1–5 result from the same shift pulse, and since the cores in the various stages are all virtually identical, the outputs occur at the same time and are essentially the same shape, except that the output from the OR gate 14 will have a greater magnitude and will be wider than the output from the AND gate 12, thus assuring the desired inhibit function. Any reverse current flow in the transformer secondary winding 36 is by-passed by the diode 39. The diode 39 also eliminates the possibility of generating an erroneous command due to back swing. Similarly, if there is an incorrect "1" pulse at the output of stage 4, the reverse current flowing from the diode 30 will also serve to prevent "positive" current in the primary winding 34. Thus, it is clear that the system will fail safe with any improper address.

The system will also fail safe under the following other failure conditions:

(1) If the AND buss 16 opens, no current can be applied to the primary winding 34 in the proper direction;

(2) If the AND buss 16 is grounded, the output from stage 1 of the shift register will be short-circuited and no current will flow through the primary winding 34;

(3) If the OR buss 20 opens, the primary winding circuit is opened and no current will flow through the primary winding 34;

(4) If the OR buss 20 is grounded, then outputs that arrive at the stages 3 and 4 are short-circuited to ground and the incoming code would not get past these stages in the shift register; since the system requires a "1" pulse in stage 1, a command cannot be generated;

(5) Transistor failure or reduced transistor current gain will not result in a false command since the transistor is used only to amplify uninhibited outputs from the secondary winding 36 of the inhibitor-transformer 32;

(6) A short circuit in the secondary winding 36 will result in no signal transfer to the base of transistor 48; and (7) An open circuit in the secondary of transformer 32 will similarly result in no transmission of signal to the base 50 of transistor 48.

While in the particular example shown a five-bit shift register is illustrated, the binary elements of the register may be cascaded indefinitely with no change in the operation of the system. The important principle is that the output of each of those stages which, when properly addressed, has a pulse representing "1" is connected to one of the gates and each of the stages having no output, representing a zero, is connected to the other of the gates.

Another important principle of this invention is that one of the gates when provided with an improper signal serves to short-circuit the command signal, while the other of the gates serves to prevent "positive" current in the primary winding of the inhibitor-tranformer.

While in the illustrated embodiment the correct code must produce positive pulses from the stages connected to the AND gate and no pulses from the stages connected to the OR gate, it is clear that the system will also operate on negative pulses by reversing the polarities of each of the diodes. What is basic to the system is that the absence of an appropriate pulse to the AND gate shorts out the command signal while the presence of an inappropriate pulse at the OR gate serves to stop positive current in the primary winding of the inhibitor-transformer 32.

The successful operation of the system also requires that the least significant bit of the particular binary code used be a "1" bit. Such demand dictates that only codes representing odd numbers can be used, thus making operation of the AND gate 12 impossible until the shift register 10 has been filled with coded information.

Having thus described a typical embodiment of this invention, it will be obvious to persons skilled in the art that various modifications and adaptations are readily available. It is intended, therefore, that the invention be limited only by the following claims as interpreted in the light of the prior art.

What is claimed is:

1. The combination comprising:

an electric translating device having an input circuit and an output circuit;

a source of direct current command signals of one polarity, said signals being applied to said input circuit for command current flow in one direction to produce a command signal in said output circuit;

a plurality of sources of control signals of said one polarity;

first means responsive to the absence of control signals in certain of said sources of control signals for short-circuiting said source of direct current command signals; and second means responsive to the presence of control signals in other of said sources for neutralizing the current flowing through said input circuit of said device with currents flowing in a direction opposite to said command current flow in said one direction.

2. The invention as defined in claim 1 wherein said second means includes a diode connected across said input circuit, said diode being supplied with said control signals from the other of said sources and being poled for conduction in a direction opposite to said command current flow in said one direction.

3. The invention as defined in claim 2 wherein said electric translating device is a transformer and wherein said input circuit is the primary winding of said transformer and said output circuit is the secondary winding of said transformer.

4. The combination comprising:

a transformer having primary and secondary windings;

a source of command signals of one polarity;

a plurality of sources of control signals of said one polarity;

an AND gate having a plurality of input leads and an output lead, said output lead being connected to one side of said primary winding through a first diode poled for current flow through said primary winding in one direction, said source of command signals being connected to said one side of said transformer through said diode, each of said plurality of input leads being connected to certain respective ones of said plurality of sources of control signals, said AND gate also including means responsive to the absence of a control signal applied to any one of said input leads for shunting the currents in said output lead from said primary winding;

an OR gate having a plurality of input leads and an output lead, said output lead of said OR gate being connected to the other side of said primary winding each of said plurality of input leads of said OR gate being connected to respective ones of the remaining of said sources of control signals, said OR gate developing currents at its output lead in response to the presence of control signals in any one of said respective ones of the remaining of said sources of control signals; and a second diode connected across said primary winding said second diode being poled for conduction in opposition to current flowing from the output lead of said AND gate.

5. The invention as defined in claim 4, and a means fc back-biasing said first diode for clipping the current flowing through the output lead of said AND gate.

6. The invention as defined in claim 4 wherein said AND gate comprises a plurality of diodes each connected between the respective one of said plurality of sources of control signals and the output lead of said AND gate, said diodes being poled for conduction of currents from said source of command signal, and being back biased beyond cut-off by currents from the respective ones of said control signals.

7. The invention as defined in claim 6 wherein said OR gate comprises a plurality of diodes each connected between the respective ones of said remaining plurality of control signals and the output lead of said OR gate, said diodes being poled for conduction of currents from respective ones of said remaining sources of control signals.

8. The invention as defined in claim 4 wherein said sources of command and control signals comprise a digital shift register having a plurality of stages, the output from the stage representing the least significant digital bit constituting said source of command signals, the outputs from the remaining stages representing said plurality sources of control signals.

9. The invention as defined in claim 8 wherein said digital shift register is binary, the prsence of an output voltage of said one polarity in any stage representing a "1," the absence of a pulse in any stage representing a "0."

10. The invention as defined in claim 9 wherein the stages properly containing an output voltage of said one polarity are said certain ones of said plurality of sources, and the remaining stages are the remaining of said sources.

11. The invention as defined in claim 4, and a current flow control device having an input circuit connected across said secondary winding, said device being normally biased beyond cut-off and being rendered conductive only on the application of currents resulting from current flow through said primary winding in said one direction.

12. The combination comprising:

a binary shift register having a plurality of stages, each when properly filled with a binary number has an output of a first given voltage level relative to ground representing a binary "1" or a second voltage level relative to ground representing a binary "0";

a transformer having a primary winding and a secondary winding, one side of said primary winding being connected to ground;

circuit means connecting the output from the stage representing the least significant bit of said binary number for current flow through said primary winding in one direction, said means including a voltage-dropping impedance, and a first diode in series, said first diode being poled for current flow in said one direction and being back-biased for clipping said output from the stage representing said least significant bit;

a plurality of diodes connected across said voltage-dropping impedance, said diodes being poled to provide a short-circuiting connection across said primary winding for current flowing through said impedance, each of said diodes being connected to a respective output of said stages having a voltage level representing a binary "1," said voltage level serving to back bias each of said diodes beyond cut-off;

a second plurality of diodes, each of said second plurality of diodes being connected between the outputs of respective ones of said stages having a second voltage level representing the binary "0" and said primary winding for current flow in the opposite direction; and an additional diode connected across said primary winding, said additional diode being oppositely poled with respect to said first diode.

13. The invention as defined in claim 12 wherein said second level is zero volts.

References Cited

UNITED STATES PATENTS

| | | | |
|---|---|---|---|
| 3,200,373 | 8/1965 | Rabinow | 340—146.3 |
| 3,145,309 | 8/1964 | Bothwell et al. | 307—88.5 |
| 3,278,755 | 10/1966 | Czok et al. | 307—88.5 |

MALCOLM A. MORRISON, *Primary Examiner.*

C. E. ATKINSON, *Assistant Examiner.*

U.S. Cl. X.R.

235—153; 307—217; 328—119; 340—147